Nov. 13, 1962

C. A. COOK 3,063,529

LOCKING CLUTCH

Filed Sept. 25, 1959

*INVENTOR.*
CHARLES A. COOK
BY
Kenneth C. Witt
ATTORNEY.

Nov. 13, 1962
C. A. COOK
3,063,529
LOCKING CLUTCH
Filed Sept. 25, 1959
2 Sheets-Sheet 2
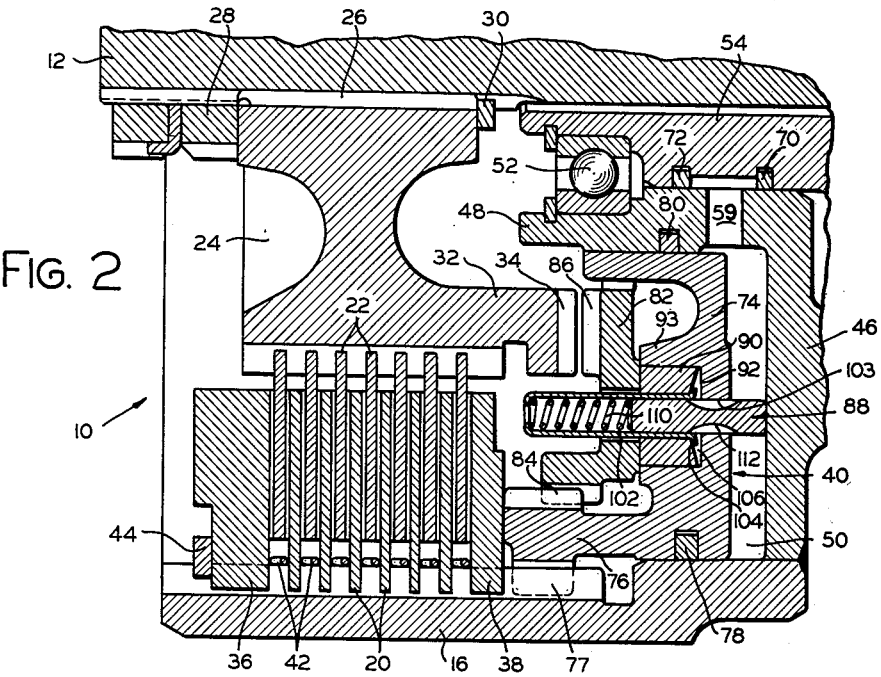
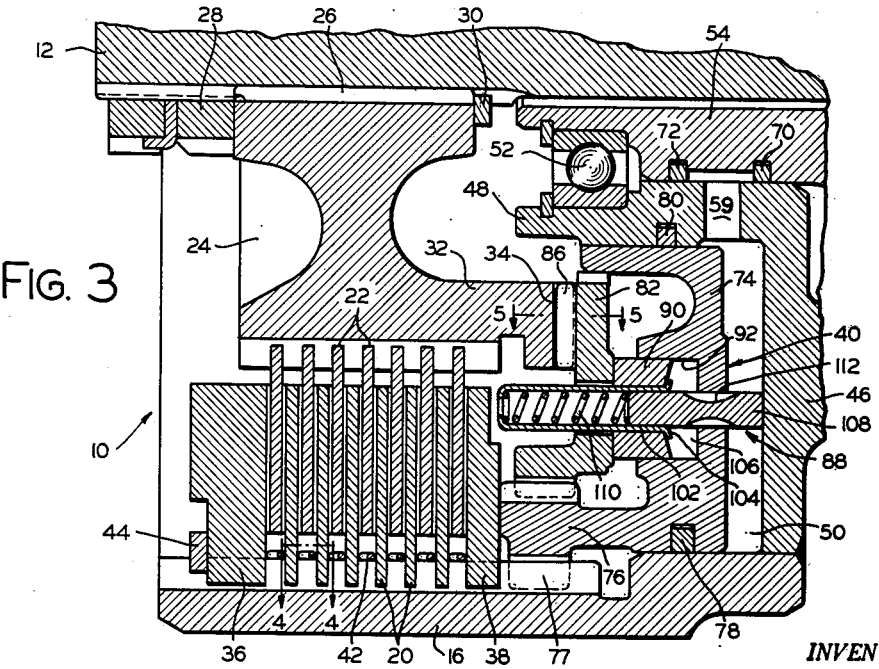
INVENTOR.
CHARLES A. COOK
BY Kenneth C. Witt
ATTORNEY.

United States Patent Office 3,063,529
Patented Nov. 13, 1962

3,063,529
LOCKING CLUTCH
Charles A. Cook, Jackson, Mich., assignor to Clark Equipment Company, a corporation of Michigan
Filed Sept. 25, 1959, Ser. No. 842,288
12 Claims. (Cl. 192—53)

The present invention relates generally to a new and improved clutch mechanism and is particularly concerned with a friction type clutch which is provided with mechanism for synchronizing and positively locking together two relatively rotatable members as, for example, in a vehicle transmission.

In transmission for use in heavy duty vehicles, and particularly in very large power shifted transmission it has become necessary to provide clutches of relatively large capacity in view of the increasingly heavy loads that the clutches are forced to carry. The clutches commonly employed in such transmissions are of the multiple disc type, comprising a number of interleaved clutch plates or discs respectively carried by the two rotatable members to be connected together, and these clutch plates are usually moved into engagement by means of a fluid operated piston or the like. Prior attempts to meet the problem of providing larger capacity clutches have included the provision of clutch plates having larger contacting areas in order to increase the frictional force, the provision of a greater number of clutch plates in order to increase the total effective force, or the use of a combination of these factors. Such proposals are not altogther satisfactory, however, since they involve an increase in the space required for the clutch, plus the attendant necessity for using control valves, hoses, fittings, and pumps of increased size. Moreover, the use of clutches of increased size may make the transmission so large and bulky that it will not fit conveniently into the available space on the vehicle. All of these factors increase considerably the cost of the transmission and make its maintenance and repair more difficult. In addition, when it is desired to manufacture a full line of clutches, that is, a line of clutches running from those of relatively small capacity to those of much larger capacity, it is both inconvenient and costly to resort to changes in the size of the plates or to the use of an increased number of plates to increase clutch capacity due to the tooling expense involved in providing parts for clutches of radically diffierent construction. In addition, after such clutches have been installed in different vehicles, problems are encountered with respect to high service costs both for parts and labor due to the necessity for stocking a large number of spare parts when components of different design are employed on different transmissions that may be serviced in a single garage or repair shop.

In a previously filed co-pending application, Serial No. 702,421, filed December 12, 1957, by Walter H. Freitag and me as joint inventors, we have disclosed a new and novel friction type clutch for connection two relatively rotatable members and including positive clutch elements for connecting the members in order to insure drive therebetween even though the input torque exceeds the holding capacity of the friction clutch elements. In such prior application we have disclosed a structure wherein both the friction type clutching elements and the positive type clutching elements are subjected to fluid pressure simultaneously and means are provided for preventing engagement of the positive type clutching elements until rotation of the members is substantially synchronized.

The structure and operation of the present invention constitutes an improvement upon the above mentioned arrangement. Briefly stated, the present invention provides an improvement in the manner of controlling the sequential operation of the friction and positive type clutching elements and includes an arrangement whereby the friction type clutch elements are first actuated by the application of fluid under pressure to substantially synchronize the relatively rotatable members and the pressure fluid is subsequently applied to actuate the positive type clutch elements only after the friction type clutch elements have been fully engaged.

The present invention has for its principal object the provision of a clutch including friction plates of the type described above for connecting two relatively rotatable members and also including a positive type clutch for connecting the members in order to insure drive therebetween even though the input torque exceeds the holding capacity of the friction clutch elements.

A further object of the invention is to provide a clutch mechanisms of the above character which includes new and improved mechanism for preventing engagement of the positive clutch until the rotatable members are substantially synchronized.

It is another object of the invention to provide a fluid operated, friction clutch for interconnecting a pair of relatively rotatable members together with a positive clutch which also functions to connect the rotatable members and which is operated by the fluid pressure delivered to the friction clutch.

A still further object of the present invention is to provide a clutch having a large capacity which is nevertheless characterized by simple, compact construction so that it can be conveniently used in transmissions where space must be conserved.

A still further and more specific object of the invention is to provide a fluid operated clutch for connecting two relatively rotatable members together which clutch includes both friction clutch means and positive clutch means together with means for sequently actuating same.

A still further object of the invention is to provide a pressure fluid control arrangement whereby the friction type clutch elements are actuated throughout their full range of movement prior to the application of pressure fluid to the positive type clutch elements.

The invention, both as to its organization and manner of operation, together with further objects and advantages, will be understood by reference to the following detailed description taken in conjunction with the accompanying drawings wherein:

FIGURE 2 is an enlarged fragmentary sectional view showing one half of the clutch mechanism of FIGURE 1, the elements thereof being shown in the relative positions occupied when the friction type clutch is engaged and the positive type clutch is disengaged;

FIGURE 3 is an enlarged fragmentary sectional view similar to FIGURE 2, but showing the elements in the relative positions occupied when both the friction type clutch and the positive type clutch are engaged;

Figure 1:
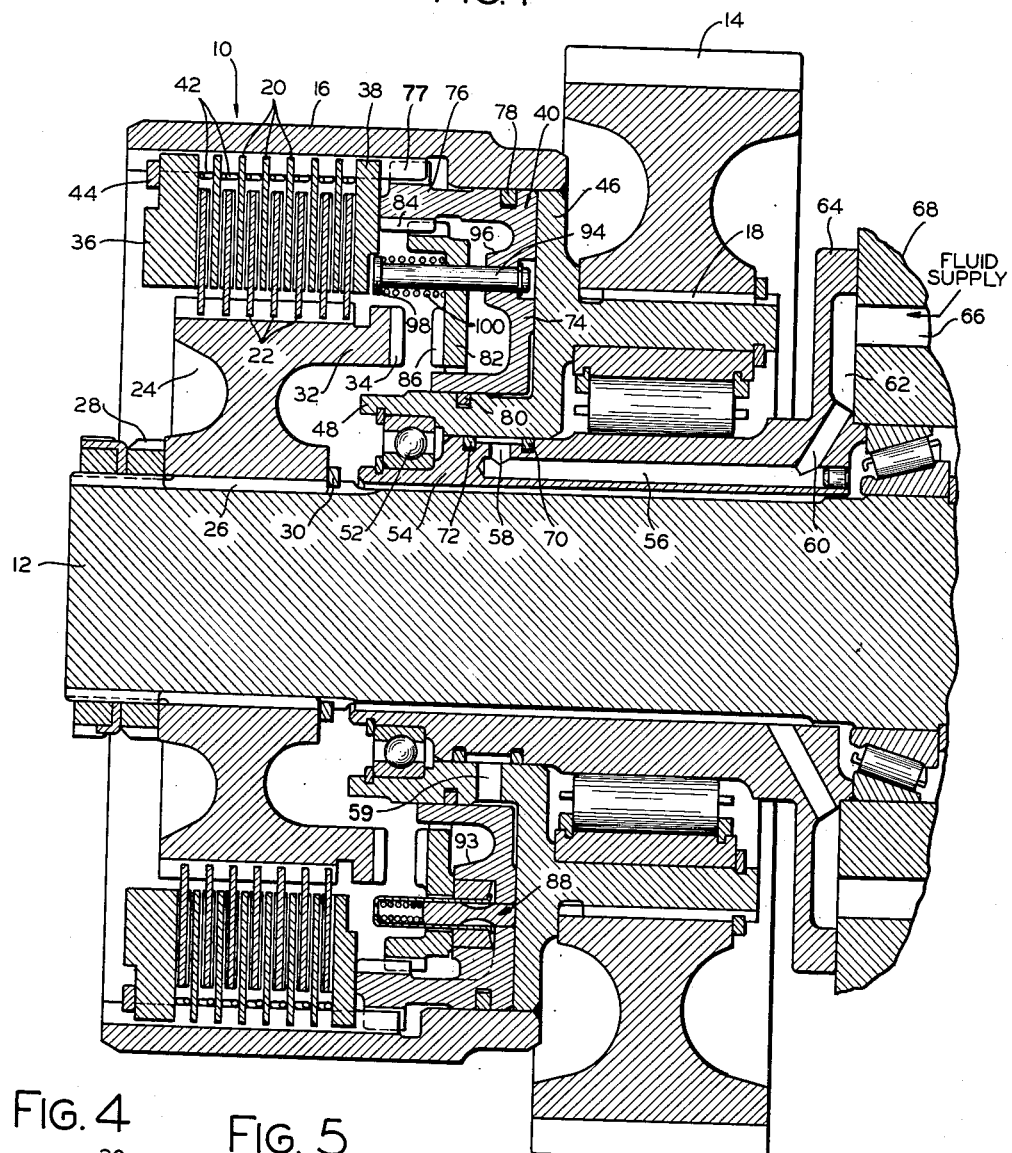
FIGURE 1 is an axial cross-sectional view through a a clutch mechanism embodying the present invention, the elements thereof being shown in the positions occupied thereby when both the friction and positive type clutch elements are disengaged.

Referring now to the drawings and particularly to FIGURE 1 thereof, the clutch mechanism of the present invention there identified generally by the reference numeral 10 is employed to interconnect a pair of relatively rotatable members, for example, in a transmission. More specifically, the clutch 10 is adapted to connect an inner shaft 12 with a rotatable gear 14 encircling the inner shaft. To this end, a clutch drum 16 is splined to the gear 14 as indicated at 18 and this drum carries a plurality of annular clutch discs or plates 20 interleaved with a somewhat similar group of clutch plates 22 carried upon a clutch support element 24 which is, in turn, splined to the inner shaft 12 as indicated at 26. Thus, when the interleaved plates 20 and 22 are forced into frictional engagement by mechanism to be described more fully hereinafter, the rotatable gear 14 is connected to the inner shaft 12 by means of the gripping action between the sets of plates 20 and 22. The clutch plate support 24 is maintained in fixed axial position relative to the shaft 12 by means of a nut 28 on the inner shaft 12 at one side of the support and a snap ring 30 at the other side thereof which is seated within an annular groove in the shaft. The support element 24 further includes an annular flange 32 extending toward the right as viewed in FIGURE 1 and provided on its axially outer face with a plurality of radially disposed equally spaced teeth or projections 34 which function as one of the clutch elements of the positive type clutch to be described more fully below.

The clutch drum 16 carries a pair of annular face blocks 36 and 38 cooperating with a fluid operated piston 40 to effect frictional engagement of the plates 20 and 22. Blocks 36 and 38 are normally biased apart by means of a plurality of spacer springs 42 so that the plates 20 and 22 are normally held out of engagement. The spacer springs 42 normally seat the clutch block 36 against a fixed stop 44 in the form of an annular ring seated within a groove in the inner face of the clutch drum 16. The clutch block 38 is, of course, mounted for sliding movement upon the clutch drum 16 and, when it is moved to the left as viewed in FIGURE 1 by movement of the piston 40, it functions to compress the spacer springs 42 and to force the plates 20 and 22 into engagement.

The clutch drum 16 includes an integrally attached front wall portion 46 provided with an axially extending annular flange 48 which cooperates with the outer annular flange of the drum 16 to define a chamber 50 (FIGURE 2) accommodating the head of the piston 40. As indicated above, the flange 48 is also connected to the rotatable gear 14 by means of the spline connection identified by the reference numeral 18. The annular flange 48 is suitably mounted adjacent its free end upon a bearing 52 which, in turn, is carried upon a stationary sleeve 54 encircling and telescoping over the inner shaft 12. For the purpose of supplying fluid to the chamber 50 in order to move the piston 40 to the left as viewed in FIGURE 1, the sleeve 54 is provided with a longitudinal passage 56 which is connected through radial passages 58 and 59 to the chamber 50 and which is also connected through a generally radial passage 60 to a radial groove 62 defined in a radially extending flanged portion 64 connected to the sleeve 54. The radial groove 62 communicates with a fluid passage 66 formed in a fluid supply ring 68 abutting the flanged portion 64 of the sleeve 54. The fluid passage 66 receives fluid under pressure from any suitable type of hydraulic control system, and this pressure is supplied through appropriate control valves whenever the members 12 and 14 are to be connected. Suitable means are provided for preventing escape of fluid between the engaging surfaces of the flange 48 and the sleeve 54 which means may comprise sealing rings 70 and 72 carried within annular grooves defined in the sleeve 54.

The piston 40 comprises an annular head portion 74 seated snugly within the chamber 50 together with an outer annular extension 76 which is adapted to engage the movable clutch block 38 when the piston is moved to the left by means of fluid pressure supplied to the chamber 50 from the fluid supply system. The piston is splined to and slidable along the clutch drum 16 as indicated by the reference numeral 77. The piston 40 is thus movable from an inoperative position as shown in FIGURE 1 wherein the interleaved clutch plates 20 and 22 are disengaged to an operative position as shown in FIGURE 2 wherein the plates 20 and 22 are in frictional engagement. The head portion 74 of the piston 40 is provided with an annular groove in its outer periphery for accommodating a sealing ring 78 in order to prevent the escape of fluid from the chamber 50 along the outer edge of the piston head. A similar groove is provided in the flange 48 for accommodating a sealing ring 80 for preventing the escape of fluid along the inner surface of the piston head.

As previously mentioned, the clutch mechanism 10 also includes a positive type clutch which is adapted to connect the members 12 and 14 in order to insure drive therebetween even though the input torque under extremely heavy load conditions may exceed the holding capacity of the clutch plates 20 and 22. This positive type clutch includes, in addition to the plurality of projections 34 mentioned above, an annular lock-up plate 82 which is disposed concentrically within the head portion 74 of the piston 40 and is splined to and slidable relative to the extension 76 as indicated at 84. The plate 82 is also provided with a plurality of radially disposed equally spaced teeth or projections 86 which are engageable with the projections 34 to provide a positive drive from the rotatable gear 14 to the inner shaft 12 through the clutch drum 16, piston 40, plate 82, and clutch plate support element 24.

In order to actuate the positive type clutch by moving the annular lockup plate 82 axially to the left as viewed in the drawings, there is provided a fluid operated clutch drive means indicated generally by the reference numeral 88. The clutch drive means 88 includes a plurality of circumferentially spaced apart plungers or cylindrical pistons 90 mounted within suitable bores 92 in bosses 93 on the head of the piston 40. The pistons 90 are arranged in circumferential alternation with a plurality of pins 94 (FIGURE 1). The pins 94 extend through bosses 96 formed in the piston head and also pass freely through the annular lock-up plate 82. The pins 94 are each provided with a head portion as at 98 and a compression spring 100 acts between such head portion and the lock-up plate 82 to normally bias the lock-up plate into engagement with the bosses 93 on the head of the piston 40. Each of the pistons 90 is provided with a central bore through which extends a hollow tubular sleeve member 102 having a radially extending flange 104 which fits within a recess or chamber 106 formed between the piston 90 and the bore 92 in the piston 40. Slidably received within each of the hollow tubular sleeves 102 and within an axially aligned opening 103 in head portion 74 is a plunger-like valve element 108 and a compression spring 110. The valve elements 108 are provided with one or more arcuate notches 112 therein to direct the flow of pressure fluid in a manner to be described presently. Such notches are normally out of communication with the pressure fluid until such time as the friction clutch has been fully engaged.

With the above described arrangement of elements, when fluid under pressure is admitted to the chamber 50 to actuate the clutch, the piston 40, lock-up plate 82, pins 94, springs 100, pistons 90, tubular sleeves 102 and springs 110 all move toward the left in unison from the position shown in FIGURE 1 to the position shown in FIGURE 2. The clutch plates 20 and 22 are then biased into frictional engagement to frictionally clutch the rotatable gear 14 to the inner shaft 12. At this time, the positive type clutch elements comprising the engageable projections 34 and 86 are slightly spaced apart, for example, about 1/16 of an inch.

While the above described movement of the various elements is taking place, the compression springs 110 bias the valve elements 108 toward the right whereby they remain in the same position. When the piston 40 and related elements have moved to the maximum leftward position as shown in FIGURE 2 and the friction clutch elements have thus been fully engaged, the notches 112 are then in communication with the fluid under pressure in the chamber 50. Such fluid under pressure is directed through the arcuate slots 112 into the chambers 106 and results in a further movement of the pistons 90 toward the left from the position shown in FIGURE 2 to the position shown in FIGURE 3. As may be seen, such movement of the pistons 90 also results in a movement of equal extent being imparted to the lock-up plate 82 against the bias of springs 100 thereby effecting an engagement of the projections 34 and 86 and a positive drive between the rotatable gear 14 and the inner shaft 12.

Figure 4:
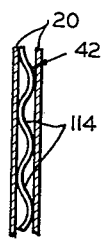
FIGURE 4 is an enlarged fragmentary view taken substantially along the line 4—4 of FIGURE 3 illustrating the construction of a spacer spring element interposed between each pair of friction discs secured to one element of the friction type clutch.

Referring now to FIGURE 4, the spacer springs 42 may be seen in detail. In many conventional clutches of the interleaved friction disc type there is provided a plurality of axially extending circumferentially spaced coil compression springs of small diameter which bear between the face blocks 36 and 38. When such coil springs are utilized the inner and outer clutch plates 20 and 22 are free to drift when the clutch is released. In clutches of large diameter and having a great number of friction plates the drift of such plates can cause serious trouble in that the plates may crowd toward one end with sufficient force to damage the plates.

In the present construction a spacer spring 42 such as shown in FIGURE 4 is interposed in each space between the outer clutch plates 20, and the set of clutch plates is, therefore, positively separated and spaced. The spacer springs 42 may, as shown, be formed of a single piece of round spring wire having a series of circumferentially equally spaced undulations 114 therein at least equal in magnitude to the desired spacing required between the clutch plates in the released position thereof.. The spacer springs 42 need not be formed into a continuous ring and may, if desired, be formed in a segment of a circle having an extent sufficient to effect the desired spring between the clutch plates 20.

Figure 5:
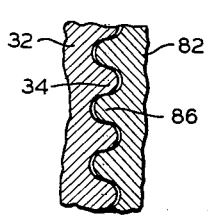
FIGURE 5 is an enlarged fragmentary view taken substantially along the line 5—5 of FIGURE 3 and showing, in developed form, one type of construction for the positive type clutch element.

Referring now to FIGURE 5, there is shown in developed form one configuration which is suitable for the engageable projections 34 and 86 of the positive type clutch. As may be seen, the teeth or projections are formed by a series of interconnecting arcuate portions such that the driving faces thereof are set at an angle or slightly inclined relative to the driving axis. This inclination introduces a force component of the driving torque which tends to force the projections apart in an axial direction.

Figure 6:
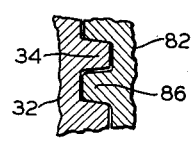
FIGURE 6 is an enlarged view similar to FIGURE 5 showing an alternative form of construction for the positive type clutch elements.

In FIGURE 6 there is shown in developed form an alternative configuration for the engageable projections 34 and 86. This form is like the conventional form of dog tooth clutch. Here again, the driving faces of the projections are set at an angle or slightly inclined relative to the driving axis to introduce a force component of the driving torque which tends to force the projections apart in an axial direction.

The specific configuration of the teeth is not critical, it only being necessary that the driving faces thereof be so inclined relative to the driving axis as to introduce a force component of the driving torque which tends to force the projections apart in an axial direction. It is preferable that the force components so introduced be sufficient to overcome friction on the interengaging faces of the projections 34 and 86 under maximum torque load conditions.

Having now described in detail the structure and general arrangement of the various elements of the clutch mechanism 10 of the present invention, it is believed that a more lucid understanding thereof may be had by describing in detail the function and operation of the various elements during a typical operation of engaging and disengaging the same.

When it is desired to actuate the clutch 10, fluid under pressure is admitted through the passageways 66, the annular groove 62, passageways 60, 56, 58 and 59 to the chamber 50. The fluid pressure in the chamber 50 forces the piston 40 to the left so that the annular extension 76 engages the movable clutch block 38 and pushes the latter to the left to compress the spacer springs 42. Movement of the clutch block 38 to the left forces the clutch plates 20 and 22 into frictional engagement and provides a friction type drive between the rotatable gear 14 and the inner shaft 12. The movement of the piston 40 also moves the lock-up plate 82 to the left to condition the engageable projections 34 and 86 for engagement. The operation as thus far described results in the various elements moving from the positions thereof shown in FIGURE 1 to the positions shown in FIGURE 2. The friction type drive thus effected will bring the rotation of the gear 14 and the inner shaft 12 into substantial synchronization.

When the piston 40 has moved substantially through its entire stroke toward the left, the grooves 112 in the valve elements 108 are uncovered and provide a passage for the flow of fluid under pressure from the chamber 50 into the circumferentially spaced chambers 106 within which are disposed the pistons 90. The fluid under pressure then causes the pistons 90 to be moved an additional increment toward the left to effect the engagement of the projections 34 and 86 and thus effect a positive drive between the rotatable gear 14 and the inner shaft 12. It is important to note that engagement of the projections 34 and 86 cannot be effected until such time as the friction type drive has been completely engaged to bring the relatively rotatable elements into substantial synchronization. If the projections 34 and 86 are formed in the manner shown in FIGURE 5, it is virtually impossible for misalignment thereof to prevent engagement of the positive type drive in uninterrupted sequence because of the rounded contours thereof which do not present any appreciable obstruction to such straightforward engagement. If, however, the projections 34 and 86 are formed in a manner similar to that shown in FIGURE 6 it is possible for misalignment thereof to result in a momentary blocking of the positive type drive if the relatively flat outer faces of such projections happen to engage squarely. This position may possibly be maintained until the input torque exceeds the holding capacity of the clutch plates 20 and 22. When the input torque becomes excessive, the clutch plates 20 and 22 tend to slip slightly to permit full engagement of the projections 34 and 86 whereupon both a friction drive and a positive drive are provided between the gear 14 and the inner shaft 12. The clutch plates 20 and 22 remain in operation simultaneously with the positive clutch so that any excess torque which would tend to produce slippage between the plates 20 and 22 is assumed by the positive clutch elements 34 and 86.

To disengage the clutch 10, the valving in the pressure fluid system is rendered effective either automatically or manually to release or reduce the fluid pressure within the chambers 106 and 50 whereupon the coil springs 100 are effective to move the lock-up plate 82 toward the right into engagement with the bosses 93 formed on the head of piston 40 in order to disengage the positive clutch elements 34 and 86. At the same time, the spacer springs 42 are effective to move the clutch block 38 to the right in order to return the piston 40 to its inoperative position as shown in FIGURE 1 at the right of the chamber 50 with the result that both the positive clutch and the friction clutch are released.

In view of the foregoing description it will be apparent that the enumerated objects of the present invention have been accomplished by the provision of a positive type clutch which assumes input torque exceeding that which is required to produce slippage between the clutch plates of the friction clutch together with a new and novel manner of automatically and sequentially controlling the engagement of such positive and friction clutches. In this manner a large capacity clutch can be provided without increasing the number of clutch plates or their size with the attendant advantages described previously in manufacturing and servicing.

While a preferred embodiment of the present invention has been shown and described, it will be recognized that various modifications will readily occur to those skilled in this art and it is therefore contemplated by the appended claims to cover all such modifications which fall within the true spirit and scope of the invention.

What is claimed as new and desired to be secured by Letters Patent of the United States is:

1. A clutch mechanism for selectively connecting a driving element and a driven element, comprising a clutch drum secured for rotation with one of said elements and including means defining a piston chamber, a plurality of clutch plates secured for rotation with the said drum, a clutch plate support secured for rotation with the other element and carrying a plurality of clutch plates interleaved with plates carried by said drum, first piston means disposed within said chamber and movable between operative and inoperative positions, means selectively operable to supply fluid under pressure to said chamber to move said first piston means from its inoperative position to its operative position in order to force the interleaved clutch plates into frictional engagement and provide a drive between said elements and also operable to release the fluid pressure in said chamber, biasing means acting in opposition to the fluid pressure and functioning when the fluid pressure is released to return said first piston means to its inoperative position whereby the interleaved plates are disengaged, second piston means mounted in said first piston means and having a head portion exposed to the fluid pressure in said chamber only when said first piston means is in its operative position, said second piston means being movable from an inoperative position to an operative position in response to the fluid pressure in said chamber, a lock-up plate slidably but non-rotatably carried upon said first piston means and movable therewith, first positive clutch means carried by said lock-up plate, and second positive clutch means carried by said clutch plate support, said second piston means being engageable with said lock-up plate to move the lock-up plate relative to said first piston means only after said first piston means has moved to its operative position thereby to engage said first and second positive clutch means whereby a positive drive is effected between the driving element and the driven element even though the input torque to the driven element exceeds the holding capacity of the interleaved plates.

2. In a clutch construction for interconnecting relatively rotatable driving and driven elements, a clutch drum secured for rotation with one of said elements and including means defining a primary piston chamber, a clutch plate support secured for rotation with the other of said elements and carrying a plurality of clutch plates interleaved with plates carried by said drum, a primary piston disposed within said primary chamber and movable between opertive and inopertaive positions, means selectively operable to supply fluid under pressure to said primary chamber to move said primary piston from its inoperative position to its operative position in order to force the interleaved clutch plates into frictional engagement and provide a drive between said elements and also operable to release the fluid pressure in said primary chamber, biasing means acting in opposition to the fluid pressure to return said primary piston to its inoperative position wherein the interleaved plates are disengaged, said primary piston having at least one secondary chamber therein, secondary piston means disposed within said secondary chamber and movable from an inoperative to an operative position in response to fluid pressure in said secondary chamber, valve means associated with said primary and secondary chambers for obstructing the flow of fluid therebetween when said primary piston is in its inoperative position, and operable to establish communication between said chambers when said primary piston is in its operative position, first positive clutch means slidably and non-rotatably carried upon said primary piston, and second positive clutch means carried upon said clutch plate support, said secondary piston being engageable with said first positive clutch means upon movement from its inoperative to its operative position to establish engagement of said first and second positive clutch means and a positive drive between said elements even though the input torque to said driven element exceeds the holding capacity of the interleaved plates.

3. A clutch construction for interconnecting relatively rotatable driving and driven elements comprising, a clutch drum secured for rotation with one of said elements and including means defining a primary piston chamber, a clutch plate support secured for rotation with the other of said elements and carrying a plurality of clutch plates interleaved with plates carried by said drum, a primary piston disposed within said primary chamber and movable between an operative position wherein the interleaved clutch plates are forced into frictional engagement to provide a drive between said elements and an inoperative position wherein the interleaved plates are disengaged, fluid operated means for controlling the flow of fluid into said primary chamber and thus the movement of said primary piston, first positive clutch means slidably and non-rotatably carried by said primary piston and movable axially thereof, second positive clutch means carried upon said clutch plate support and engageable by said first positive clutch means, at least one secondary piston chamber formed within said primary piston, a secondary piston disposed within said secondary chamber engageable with said first positive clutch means and movable between an operative position wherein said positive clutch means are engaged and an inoperative position wherein said positive clutch means are disengaged, and valve means for controlling communication between said primary and secondary chambers whereby upon actuation of said clutch said primary piston is first moved to its operative position to establish a frictional drive and substantial synchronization of said elements followed by a further movement of said secondary piston relative to said primary piston to establish a positive drive between said elements.

4. A clutch construction as specified in claim 3 including biasing means acting in opposition to the fluid pressure to return said primary piston and said secondary piston to their unoperative positions.

5. A clutch construction as specified in claim 3 including first biasing means acting in opposition to said fluid pressure to return said secondary piston to its inoperative position, and second biasing means acting in opposition to said fluid pressure to return said primary piston to its inoperative position.

6. A clutch construction as specified in claim 5 wherein said first and second biasing means are operable substantially simultaneously upon release of fluid pressure in said chambers.

7. A clutch construction for interconnecting relatively rotatable driving and driven members comprising, a fluid operated friction clutch including first and second friction clutch elements respectively connected to said members and frictionally engageable to establish drive between said members, a first fluid operated piston movable from an inoperative position wherein said elements are disengaged to an operative position wherein said elements are engaged, fluid operated means for controlling movement of said first piston, and means for supplying pressure fluid to said last named means, first and second positive type clutch elements respectively connected to said members and effective when engaged to provide a drive between said members even though the input torque to said driven member exceeds the capacity of said friction clutch, a second fluid operated piston movable in response to said pressure fluid for controlling engagement of said positive type clutch elements, and means associated with said first and second fluid operated pistons for preventing the flow of pressure fluid to said second piston until said first piston has moved substantially to its full operative position.

8. In a clutch construction, a pair of relatively rotatable driving and driven members, a friction type clutch for connecting said members, a positive type clutch for connecting said members in order to insure drive between the members irrespective of slippage of said friction type clutch, and sequential actuating means comprising a first piston and cylinder actuator for effecting engagement of said friction type clutch and a second piston and cylinder actuator having the cylinder thereof in the first mentioned piston for initiating and completing engagement of the said positive type clutch only after the said friction type clutch has reached its fully engaged position.

9. A clutch construction for interconnecting relatively rotatable driving and driven members, a fluid operated friction clutch including first and second friction clutch elements respectively connected to said members and frictionally engageable to establish drive between said members, a first fluid operated piston means movable from an inoperative position wherein said elements are disengaged to an operative position wherein said elements are engaged, fluid operated means for controlling movement of said first piston means, and means for supplying pressure fluid to said last named means, first and second positive type clutch elements respectively driven by said members and effective when engaged to provide a drive between said members even though the input torque to said driven member exceeds the capacity of said friction clutch, a second fluid operated piston means operatively connected to said first piston and movable in response to said pressure fluid for controlling engagement of said positive type clutch elements, said second piston means being movable as a unit with said first piston means throughout the full range of movement of said first piston means, and automatically and sequentially operable means operatively associated with said first and second piston means for effecting a further movement of said second piston means relative to said first piston means only after said first piston means has moved substantially throughout its full range of movement, whereby upon actuation of said clutch said first and second piston means are moved to a position to establish a frictional drive and substantial synchronization of said members followed by a further movement of said second piston means relative to said first piston means to establish a positive drive between said members.

10. A clutch construction as specified in claim 9, wherein said second piston means comprises a plurality of circumferentially spaced pistons mounted upon said first piston means.

11. In a fluid actuated clutch mechanism comprising two clutches, sequential operating means comprising a first cylinder and a first piston movable therein for operating one clutch, a second cylinder formed in the said first piston and a second piston movable in the said second cylinder for operating the other clutch, and means for admitting fluid to the said second cylinder only after a predetermined movement of the said first piston in the said first cylinder comprising an opening in the said first piston interconnecting the said two cylinders and a valve member slidable in the said opening and biased to remain unmoved relative to the said first cylinder as the said first piston moves therein.

12. In a fluid actuated clutch mechanism comprising two clutches, sequential operating means comprising a first cylinder and a first piston moveable therein for operating one clutch, a second cylinder formed in the said first piston and a second piston movable in the said second cylinder for operating the other clutch, and means for admitting fluid to the said second cylinder only after a predetermined movement of said first piston in the said first cylinder, said last named means comprising axially aligned openings in the said first and second pistons, the opening in the said first piston interconnecting the said two cylinders, the opening in said second piston being larger than the opening in the first piston, a valve member slidable in the opening in the said first piston and extending into the opening in said second piston, a sleeve member surrounding the said valve member in the said opening in the second piston and extending away from the said first cylinder and having an inwardly disposed flange portion at the outer end, and a compression spring extending between the said flange portion and the end of the said valve member biasing the said valve member to remain unmoved relative to the said first cylinder as the said first piston moves therein, and passageway means in the said valve member arranged to be uncovered only after the said predetermined movement of the said first piston to provide communication between the said first and second cylinders.

References Cited in the file of this patent

UNITED STATES PATENTS

| | | |
|---|---|---|
| 1,950,914 | Blakely | Mar. 13, 1934 |
| 2,592,695 | Hindmarch | Apr. 15, 1952 |
| 2,633,954 | Allen | Apr. 7, 1953 |
| 2,633,955 | Allen et al. | Apr. 7, 1953 |
| 2,667,035 | Marsden | Jan. 26, 1954 |
| 2,807,343 | Ryder et al. | Sept. 24, 1957 |
| 2,883,021 | Hill | Apr. 21, 1959 |

FOREIGN PATENTS

| | | |
|---|---|---|
| 761,411 | Great Britain | Nov. 14, 1956 |